(12) United States Patent
Arai

(10) Patent No.: US 11,423,862 B2
(45) Date of Patent: Aug. 23, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kimitaka Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/076,353

(22) Filed: Oct. 21, 2020

(65) Prior Publication Data

US 2021/0134244 A1     May 6, 2021

(30) Foreign Application Priority Data

Oct. 30, 2019  (JP) .............................. JP2019-197998

(51) Int. Cl.
| | | |
|---|---|---|
| G09G 5/06 | (2006.01) | |
| G06T 7/10 | (2017.01) | |
| G06T 11/00 | (2006.01) | |
| H04N 1/60 | (2006.01) | |
| H04N 5/57 | (2006.01) | |
| H04N 9/64 | (2006.01) | |
| H04N 9/69 | (2006.01) | |
| H04N 9/77 | (2006.01) | |
| G06T 7/11 | (2017.01) | |
| G06T 7/174 | (2017.01) | |

(52) U.S. Cl.
CPC ................. *G09G 5/06* (2013.01); *G06T 7/11* (2017.01); *G06T 7/174* (2017.01); *G06T 11/001* (2013.01); *G06T 2207/10024* (2013.01); *G09G 2320/0242* (2013.01); *G09G 2352/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,469,536 A | * | 11/1995 | Blank ................... | H04N 1/3873 345/594 |
| 2005/0174586 A1 | * | 8/2005 | Yoshida ............... | H04N 1/6019 358/1.9 |
| 2007/0133852 A1 | * | 6/2007 | Collins .............. | G01R 33/5601 382/128 |

(Continued)

FOREIGN PATENT DOCUMENTS

JP          2017-229064 A     12/2017

*Primary Examiner* — Wesner Sajous
(74) *Attorney, Agent, or Firm* — Canon U.S.A., Inc. IP Division

(57) ABSTRACT

An image processing apparatus includes an obtainment unit configured to obtain first image data obtained by capturing an image of an object, a generation unit configured to generate second image data representing a second image by performing conversion to maintain a specific gradation in a color saturation range in a case where a hue or color saturation of a region of interest in a first image represented by the first image data is converted according to a characteristic of a display unit, a conversion unit configured to perform conversion on the first image and the second image according to the characteristic of the display unit, and a display control unit configured to display the converted first image and the converted second image together on the display unit.

17 Claims, 18 Drawing Sheets

(56) References Cited

U.S. PATENT DOCUMENTS

| | | | | |
|---|---|---|---|---|
| 2007/0279714 | A1* | 12/2007 | Higashikata | H04N 1/6058 358/518 |
| 2008/0273794 | A1* | 11/2008 | Samworth | H04N 1/54 382/167 |
| 2010/0302404 | A1* | 12/2010 | Mizukura | H04N 1/6058 348/222.1 |
| 2012/0307270 | A1* | 12/2012 | Nakajima | H04N 1/56 358/1.9 |
| 2013/0001690 | A1* | 1/2013 | Zhu | H01L 29/78648 257/347 |
| 2013/0317369 | A1* | 11/2013 | Bryant-Greenwood | G06T 5/007 600/476 |
| 2015/0256719 | A1* | 9/2015 | Bishop | H04N 1/6058 382/167 |
| 2017/0061594 | A1* | 3/2017 | Suzuki | H04N 1/6058 |
| 2017/0180759 | A1* | 6/2017 | Mertens | H04N 19/70 |
| 2018/0232867 | A1* | 8/2018 | Park | H04N 5/235 |

\* cited by examiner

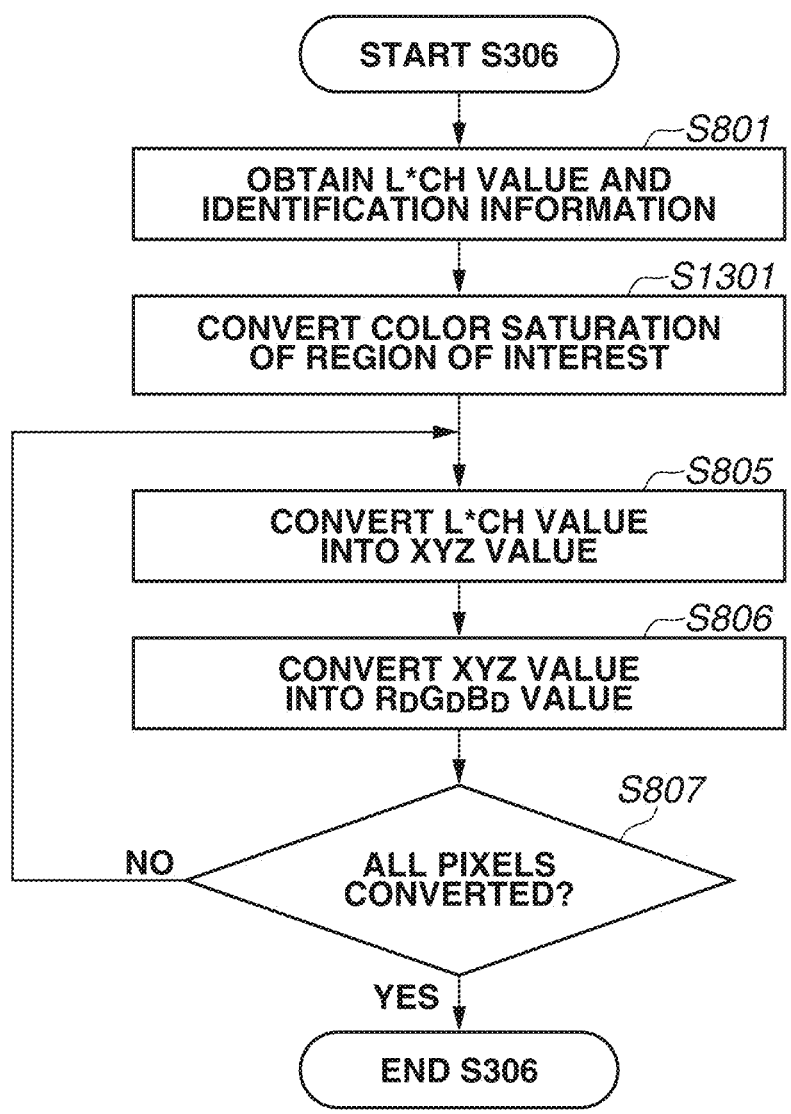

| INPUT COLOR SATURATION | OUTPUT COLOR SATURATION |
|---|---|
| 0.0 | 0.0 |
| 0.1 | 0.0 |
| 0.2 | 0.0 |
| · | |
| · | |
| · | |
| 0.8 | 0.1 |
| 0.9 | 0.5 |
| 1.0 | 1.0 |

IMAGE PROCESSING APPARATUS, IMAGE PROCESSING METHOD, AND STORAGE MEDIUM

BACKGROUND

Field of the Disclosure

The present disclosure relates to an image processing technique for evaluating color of an object.

Description of the Related Art

There is a technique for evaluating a color difference between two points on an object using image data obtained by capturing an image of the object by a camera. Japanese Patent Application Laid-Open No. 2017-229064 discusses a technique for calculating a color difference between evaluation points designated on a displayed image.

However, an image to be displayed on a display apparatus is generated in such a manner that high saturation color which cannot be expressed by the display apparatus is compressed and converted into a color gamut which can be expressed by the display apparatus. Therefore, in some cases, a user may need to designate a region to be subjected to color evaluation while referring to an image having a gradation of color saturation significantly different from that of an actual object.

SUMMARY

Embodiments of the present disclosure are made in view of the above-described issue and are directed to the provision of an image processing technique for designating an evaluation region on an image while referring to the image which is generated based on a captured image of an object and which has a gradation of color saturation close to that of the actual object.

An image processing apparatus according to the present disclosure includes an obtainment unit configured to obtain first image data obtained by capturing an image of an object, a generation unit configured to generate second image data representing a second image by performing conversion to maintain a specific gradation in a color saturation range in a case where a hue or color saturation of a region of interest in a first image represented by the first image data is converted according to a characteristic of a display unit, a conversion unit configured to perform conversion on the first image and the second image according to the characteristic of the display unit, and a display control unit configured to display the converted first image and the converted second image together on the display unit.

Further features of the present disclosure will become apparent from the following description of exemplary embodiments with reference to the attached drawings.

BRIEF DESCRIPTION OF THE DRAWINGS

FIG. 13 is a flowchart illustrating processing for generating display image data.

DESCRIPTION OF THE EMBODIMENTS

Exemplary embodiments of the present disclosure will be described below with reference to the attached drawings. The exemplary embodiments described below do not necessarily limit the present disclosure. Further, not all combinations of features described in the exemplary embodiments are deemed to be essential.

<Hardware Configuration of Image Processing Apparatus>

Figure 1:
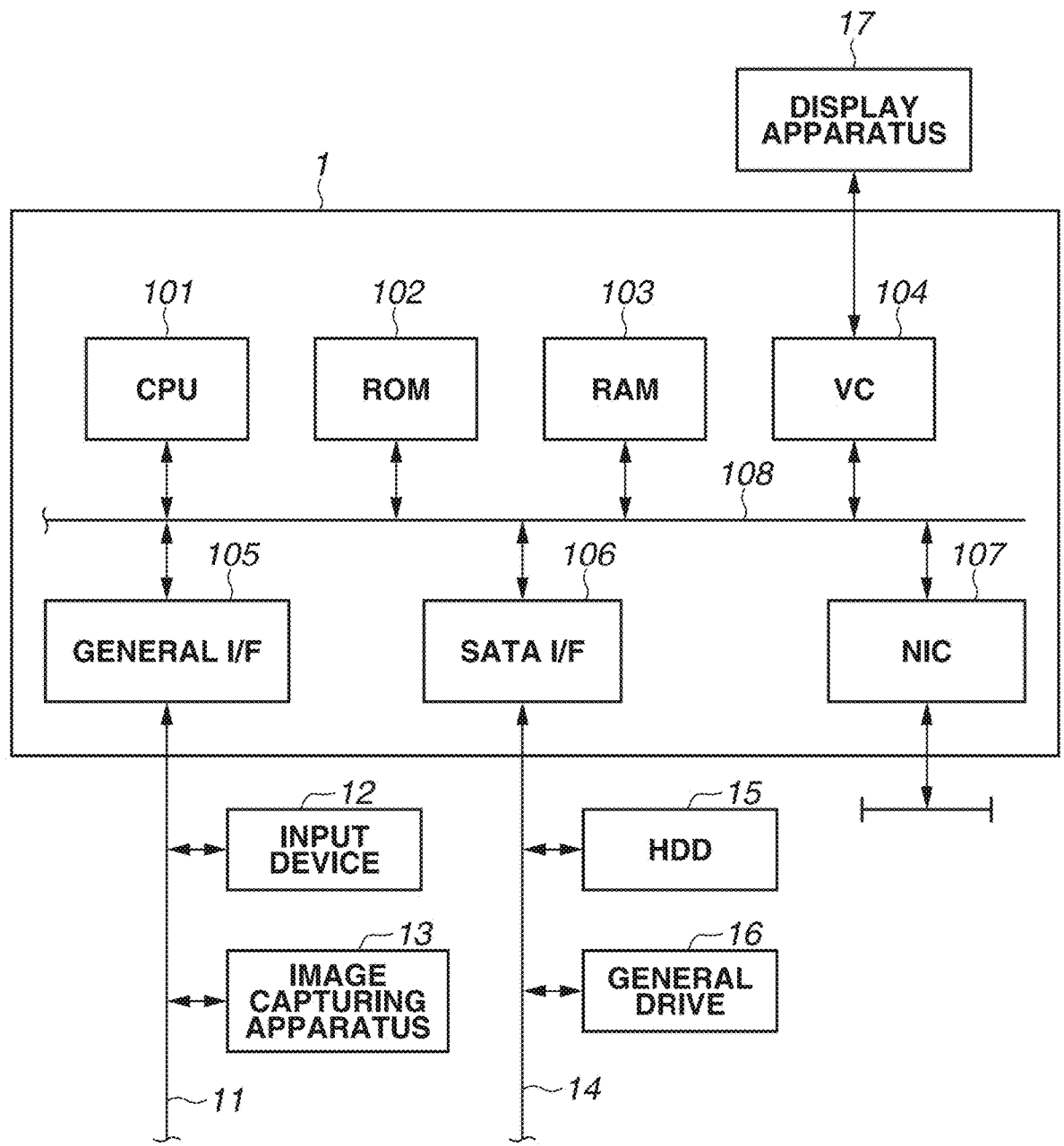
FIG. 1 is a block diagram illustrating a hardware configuration of an image processing apparatus.

A first exemplary embodiment will be described. FIG. 1 is a block diagram illustrating a hardware configuration of an image processing apparatus 1. The image processing apparatus 1 includes a central processing unit (CPU) 101, a read-only memory (ROM) 102, and a random access memory (RAM) 103. The image processing apparatus 1 further includes a video card (VC) 104, a general interface (I/F) 105, a Serial Advanced Technology Attachment (SATA) I/F 106, and a network interface card (NIC) 107. The CPU 101 uses the RAM 103 as a work memory and executes an operating system (OS) and various programs stored in the ROM 102, a hard disk drive (HDD) 15, and the like. The CPU 101 controls each configuration via a system bus 108. Processing in each flowchart described below is executed by the CPU 101 loading a program code stored in the ROM 102, the HDD 15, and the like into the RAM 103. The VC 104 is connected to a display apparatus 17. The general I/F 105 is connected via a serial bus 11 to an image capturing apparatus 13 and an input device 12 such as a mouse and a keyboard. The SATA I/F 106 is connected via a serial bus 14 to the HDD 15 and a general drive 16 for reading and writing data to and from various storage media. The NIC 107 inputs and outputs information to and from an external apparatus. The CPU 101 uses the HDD 15 and the various storage media mounted on the general drive 16 as storage locations of various pieces of data. The CPU 101 displays a graphical user interface (GUI) provided by a program on the display apparatus 17 and receives an input such as a user instruction received via the input device 12.

<Logical Configuration of Image Processing Apparatus>

Figure 2:
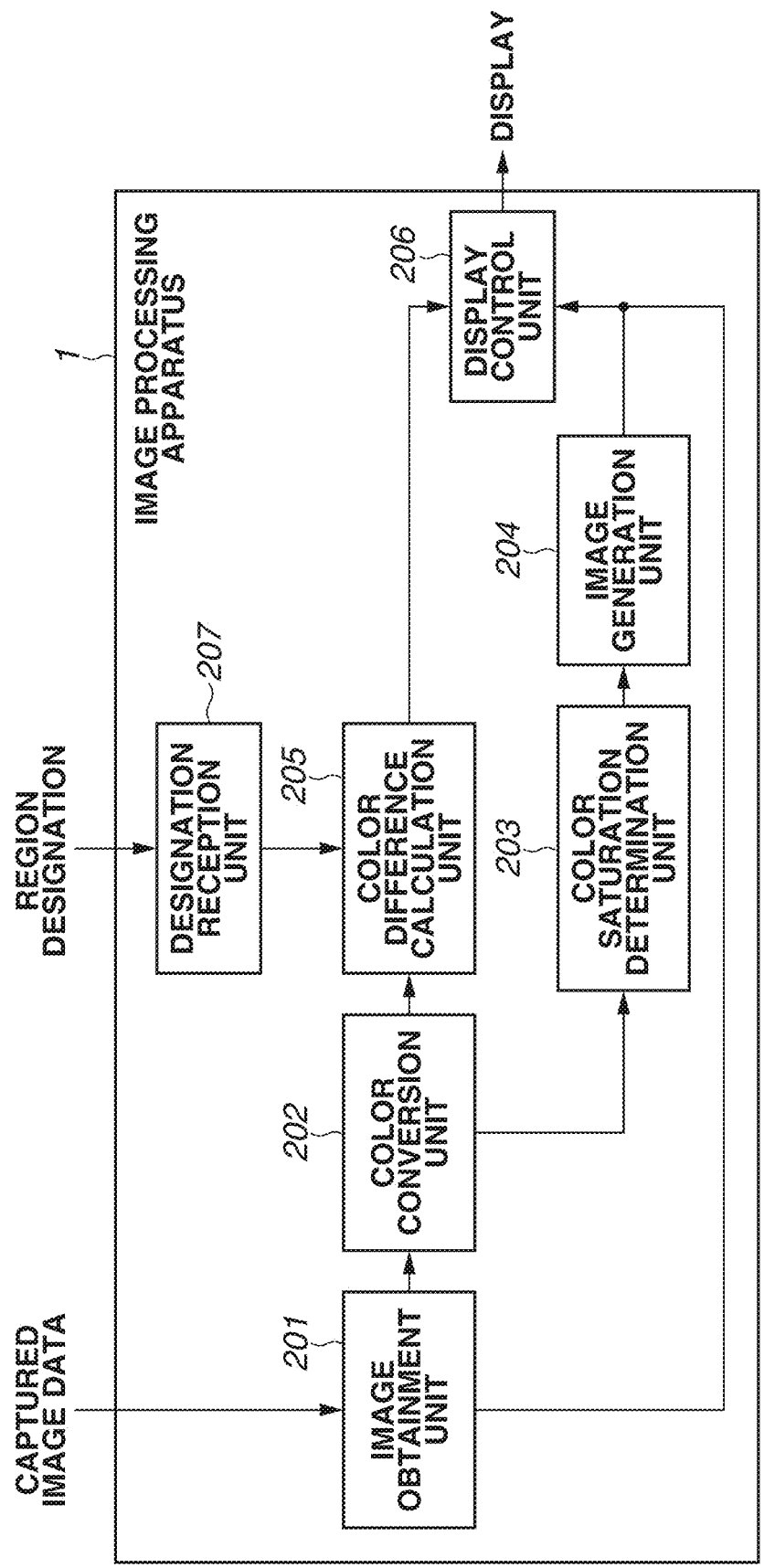
FIG. 2 is a block diagram illustrating a logical configuration of the image processing apparatus.

FIG. 2 is a block diagram illustrating a logical configuration of the image processing apparatus 1. The CPU 101 functions as a logical configuration illustrated in FIG. 2 by using the RAM 103 as the work memory and reading and executing a program stored in the ROM 102 or the HDD 15. It is not necessary for the CPU 101 to execute all processing described below, and the image processing apparatus 1 may be configured so that a part or all of the processing is executed by one or a plurality of processing circuits other than the CPU 101.

Figure 7:
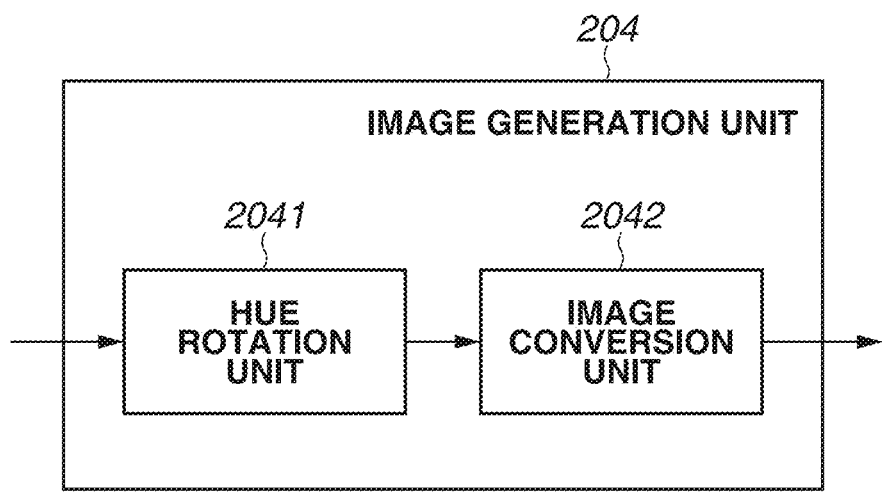
FIG. 7 is a block diagram illustrating a logical configuration of an image generation unit.

The image processing apparatus 1 includes an image obtainment unit 201, a color conversion unit 202, a color saturation determination unit 203, an image generation unit 204, a color difference calculation unit 205, a display control unit 206, and a designation reception unit 207. The image obtainment unit 201 obtains captured image data obtained by capturing an image of an object. The color conversion unit 202 converts pixel values (R, G, B) of each pixel included in a captured image represented by the captured image data into L*a*b* values (L*, a*, b*). The color saturation determination unit 203 determines a magnitude relationship between color saturation of a region of interest in the captured image and maximum color saturation which can be expressed by the display apparatus 17 with respect to a hue of the region of interest. The image generation unit 204 generates display image data representing a display image to be displayed on the display apparatus 17 based on a determination result regarding the color saturation of the region of interest. FIG. 7 is a block diagram illustrating a logical configuration of the image generation unit 204. The image generation unit 204 includes a hue rotation unit 2041 and an image conversion unit 2042. The hue rotation unit 2041 converts a hue of the captured image based on the determination result regarding the color saturation of the region of interest. The image conversion unit 2042 generates display image data based on the captured image data representing the captured image the hue of which is converted.

The designation reception unit 207 receives region information indicating a region designated by a user in a display image. The color difference calculation unit 205 calculates a color difference between the regions designated by the user. The display control unit 206 displays the display image and the color difference between the regions designated by the user on the display apparatus 17.

<Processing Executed by Image Processing Apparatus>

Figure 3:
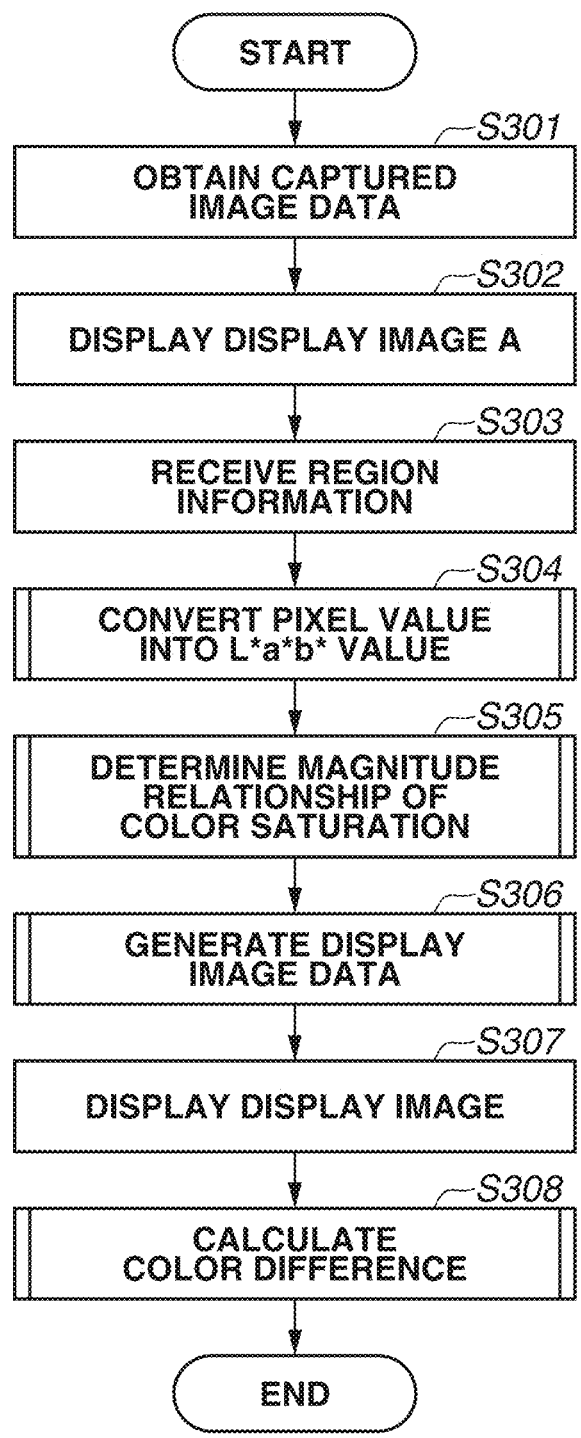
FIG. 3 is a flowchart illustrating processing executed by the image processing apparatus.

FIG. 3 is a flowchart illustrating processing executed by the image processing apparatus 1. The processing described below is started by a user instruction via the input device 12.

In step S301, the image obtainment unit 201 obtains the captured image data obtained by capturing an image of an object and reference white color signal values $(X_W, Y_W, Z_W)$. The image obtainment unit 201 according to the present exemplary embodiment obtains the captured image data and the reference white color signal values $(X_W, Y_W, Z_W)$ stored in advance in the HDD 15 therefrom.

In step S302, the display control unit 206 converts the pixel values (R, G, B) of each pixel included in the captured image represented by the captured image data into color signal values $(R_D, G_D, B_D)$ corresponding to a characteristic of the display apparatus 17. In the conversion, high saturation color which cannot be expressed by the display apparatus 17 is compressed into a color gamut which can be expressed by the display apparatus 17. In the conversion, a color conversion look-up table (LUT) is used which stores a correspondence relationship between the pixel values (R, G, B) and the color signal values $(R_D, G_D, B_D)$. The display control unit 206 displays a display image A which includes the color signal values $(R_D, G_D, B_D)$ in each pixel on the display apparatus 17. The high saturation color is compressed in the display image A, so that a gradation of color saturation of the display image A may be significantly different from that of the image-captured object compared with a display image B described below.

In step S303, the designation reception unit 207 receives the region information indicating the region of interest designated by a user in the display image A. The region information according to the present exemplary embodiment is coordinates (x, y) on the display image A.

Figure 4:
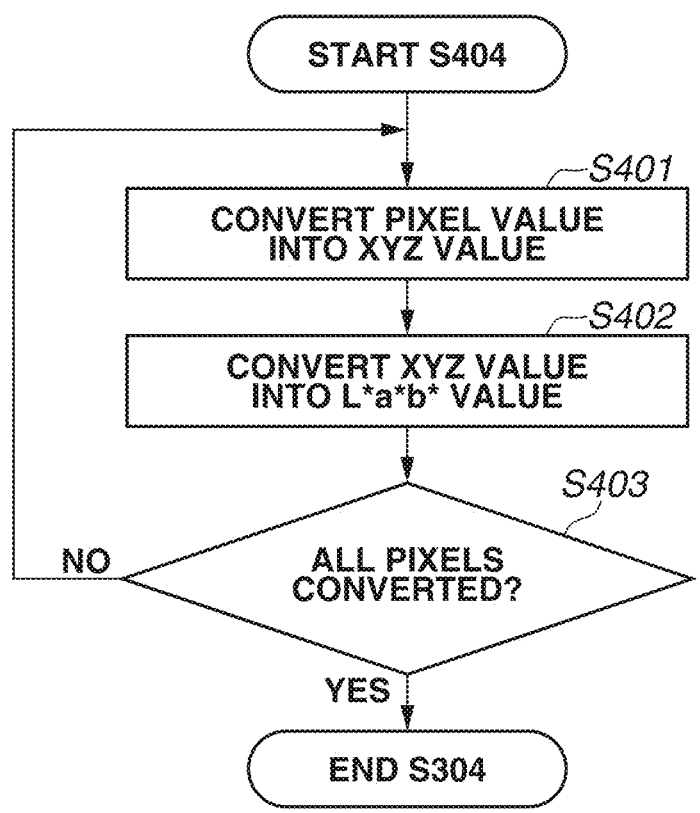
FIG. 4 is a flowchart illustrating processing for converting a pixel value into L*a*b* values.

In step S304, the color conversion unit 202 converts the pixel values (R, G, B) of each pixel included in the captured image represented by the captured image data into the L*a*b* values (L*, a*, b*). The processing for converting the pixel values (R, G, B) into the L*a*b* values (L*, a*, b*) will be described in detail below. FIG. 4 is a flowchart illustrating the processing for converting the pixel values (R, G, B) into the L*a*b* values (L*, a*, b*).

In step S401, the color conversion unit 202 converts the pixel values (R, G, B) of a pixel of interest into XYZ values (X, Y, Z) according to Equation (1). Coefficients (m11 to m33) are determined in advance using a result of image capturing and colorimetry of a color chart.

$$\begin{pmatrix} X \\ Y \\ Z \end{pmatrix} = M \begin{pmatrix} R \\ G \\ B \end{pmatrix}, M = \begin{pmatrix} m11 & m12 & m13 \\ m21 & m22 & m23 \\ m31 & m32 & m33 \end{pmatrix} \quad \text{Equation (1)}$$

In step S402, the color conversion unit 202 converts the XYZ values (X, Y, Z) of the pixel of interest into the L*a*b* values (L*, a*, b*) according to Equations (2) to (5).

$$\left. \begin{array}{l} XRate = (X/Xw)^{1/3}, \\ \text{where } X/Xw > 0.00856, \text{ and} \\ XRate = 7.787*(X/Xw) + 16.0/116.0, \\ \text{where } X/Xw \le 0.00856. \end{array} \right\} \quad \text{Equation (2)}$$

$$\left. \begin{array}{l} YRate = (Y/Yw)^{1/3}, \\ \text{where } Y/Yw > 0.00856, \text{ and} \\ YRate = 7.787*(Y/Yw) + 16.0/116.0, \\ \text{where } Y/Yw \le 0.00856. \end{array} \right\} \quad \text{Equation (3)}$$

$$\left. \begin{array}{l} ZRate = (Z/Zw)^{1/3}, \\ \text{where } Z/Zw > 0.00856, \text{ and} \\ ZRate = 7.787*(Z/Zw) + 16.0/116.0, \\ \text{where } Z/Zw \le 0.00856. \end{array} \right\} \quad \text{Equation (4)}$$

$$\left. \begin{array}{l} L^* = 116*YRate - 16.0 \\ a^* = 500*(XRate - YRate) \\ b^* = 200*(YRate - ZRate) \end{array} \right\} \quad \text{Equation (5)}$$

In step S403, the color conversion unit 202 determines whether the pixel values of all pixels in the captured image are converted into the L*a*b* values. In a case where all pixel values are not yet converted (NO in step S403), the color conversion unit 202 updates the pixel of interest and returns the processing to step S401. Whereas, in a case where the pixel values are all converted (YES in step S403), the color conversion unit 202 terminates the processing in step S304 and advances the processing to step S305.

Figure 5:
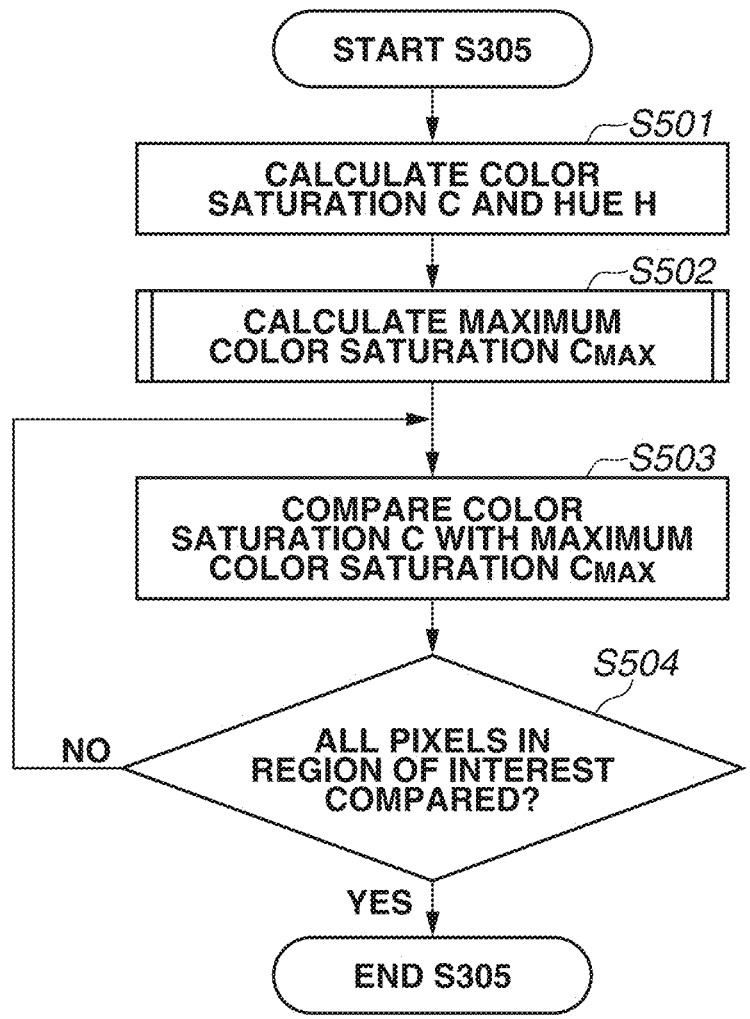
FIG. 5 is a flowchart illustrating processing for determining a magnitude relationship of color saturation.

In step S305, the color saturation determination unit 203 determines the magnitude relationship between the color saturation of the region of interest in the captured image and the maximum color saturation which can be expressed by the display apparatus 17 with respect to the hue of the region of interest. The processing for determining the magnitude relationship of the color saturation is described in detail below. FIG. 5 is a flowchart illustrating the processing for determining the magnitude relationship of the color saturation.

In step S501, the color saturation determination unit 203 calculates color saturation C and a hue H for all pixels in the captured image according to Equation (6).

$$\left. \begin{array}{l} C = \sqrt{a^{*2} + b^{*2}} \\ H = \tan^{-1}(b^*/a^*) \end{array} \right\} \quad \text{Equation (6)}$$

Figure 6:
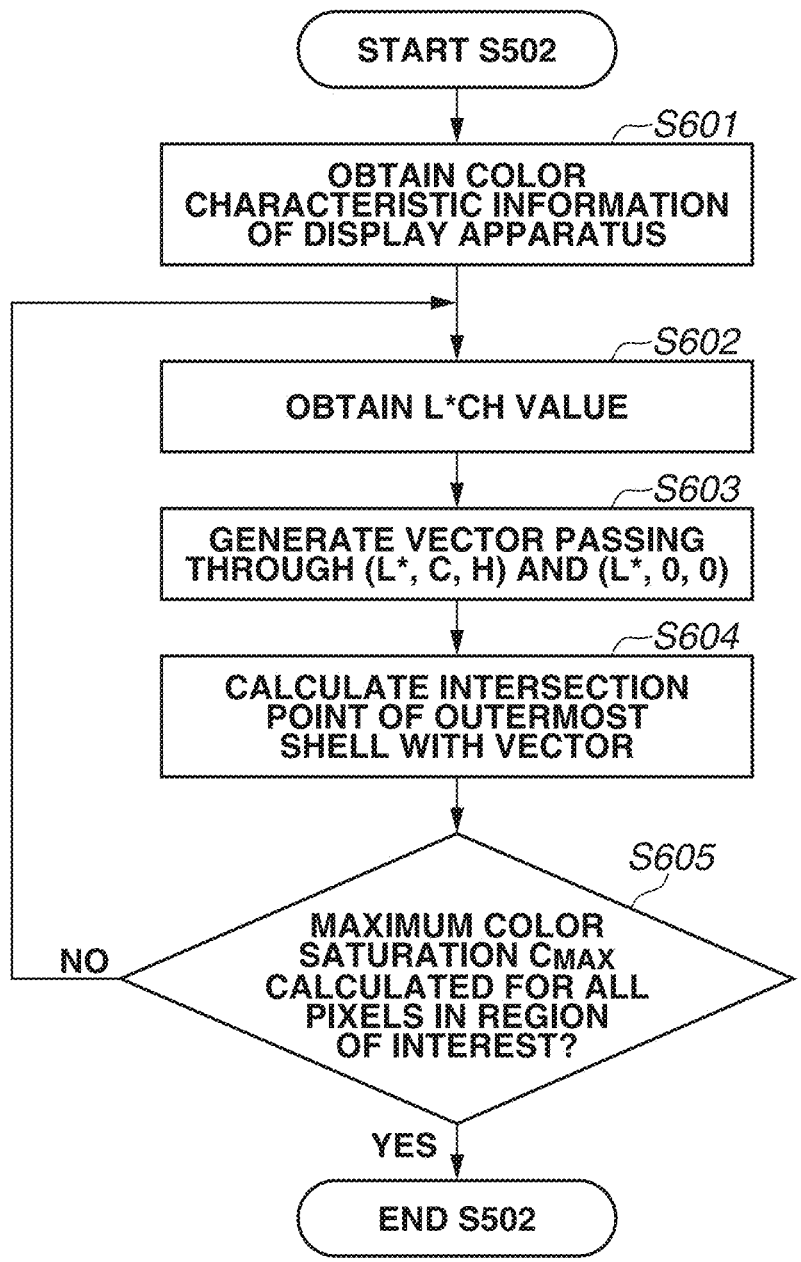
FIG. 6 is a flowchart illustrating processing for calculating maximum color saturation $C_{MAX}$.

In step S502, the color saturation determination unit 203 calculates maximum color saturation $C_{MAX}$ which can be expressed by the display apparatus 17 with respect to the hue H of the region of interest. The processing for calculating the maximum color saturation $C_{MAX}$ will be described in detail below. FIG. 6 is a flowchart illustrating the processing for calculating the maximum color saturation $C_{MAX}$. In step S601, the color saturation determination unit 203 obtains information indicating a characteristic of color which can be displayed by the display apparatus 17. Specifically, the color saturation determination unit 203 obtains information indicating a coordinate group on an outermost shell of the color gamut of the display apparatus 17 in an L*CH color space.

In step S602, the color saturation determination unit 203 obtains lightness L*, the color saturation C, and the hue H of the pixel of interest in the region of interest. In step S603, the color saturation determination unit 203 generates a vector passing through coordinates (L*, C, H) corresponding to the pixel of interest and coordinates (L*, 0, 0) on a lightness axis in the L*CH color space. In step S604, the color saturation determination unit 203 calculates an intersection point of a triangular element (a polygon) forming the outermost shell of the color gamut of the display apparatus 17 and the generated vector and records coordinates of the intersection point. The coordinates of the intersection point on a color saturation axis are the maximum color saturation $C_{MAX}$ which can be expressed by the display apparatus 17 with respect to the hue H of the pixel of interest. In step S605, the color saturation determination unit 203 determines whether the maximum color saturation $C_{MAX}$ is calculated for all pixels in the region of interest. In a case where the maximum color saturation $C_{MAX}$ is not calculated for all pixels in the region of interest (NO in step S605), the color saturation determination unit 203 updates the pixel of interest and returns the processing to step S602. Whereas, in a case where the maximum color saturation $C_{MAX}$ is calculated for all pixels in the region of interest (YES in step S605), the color saturation determination unit 203 terminates the processing in step S502 and advances the processing to step S503.

In step S503, the color saturation determination unit 203 compares the color saturation C with the maximum color saturation $C_{MAX}$ for the pixel of interest in the region of interest. In a case where the maximum color saturation $C_{MAX}$ is larger, a value of zero is stored as identification information of the pixel of interest, whereas in a case where the color saturation C is larger, a value of one is stored as the identification information of the pixel of interest. In step S504, the color saturation determination unit 203 determines whether determination regarding the color saturation is performed for all pixels in the region of interest. In a case where the determination is not performed for all pixels in the region of interest (NO in step S504), the color saturation determination unit 203 updates the pixel of interest and returns the processing to step S503. Whereas in a case where the determination is performed for all pixels in the region of interest (YES in step S504), the color saturation determination unit 203 terminates the processing in step S305 and advances the processing to step S306.

Figure 8:
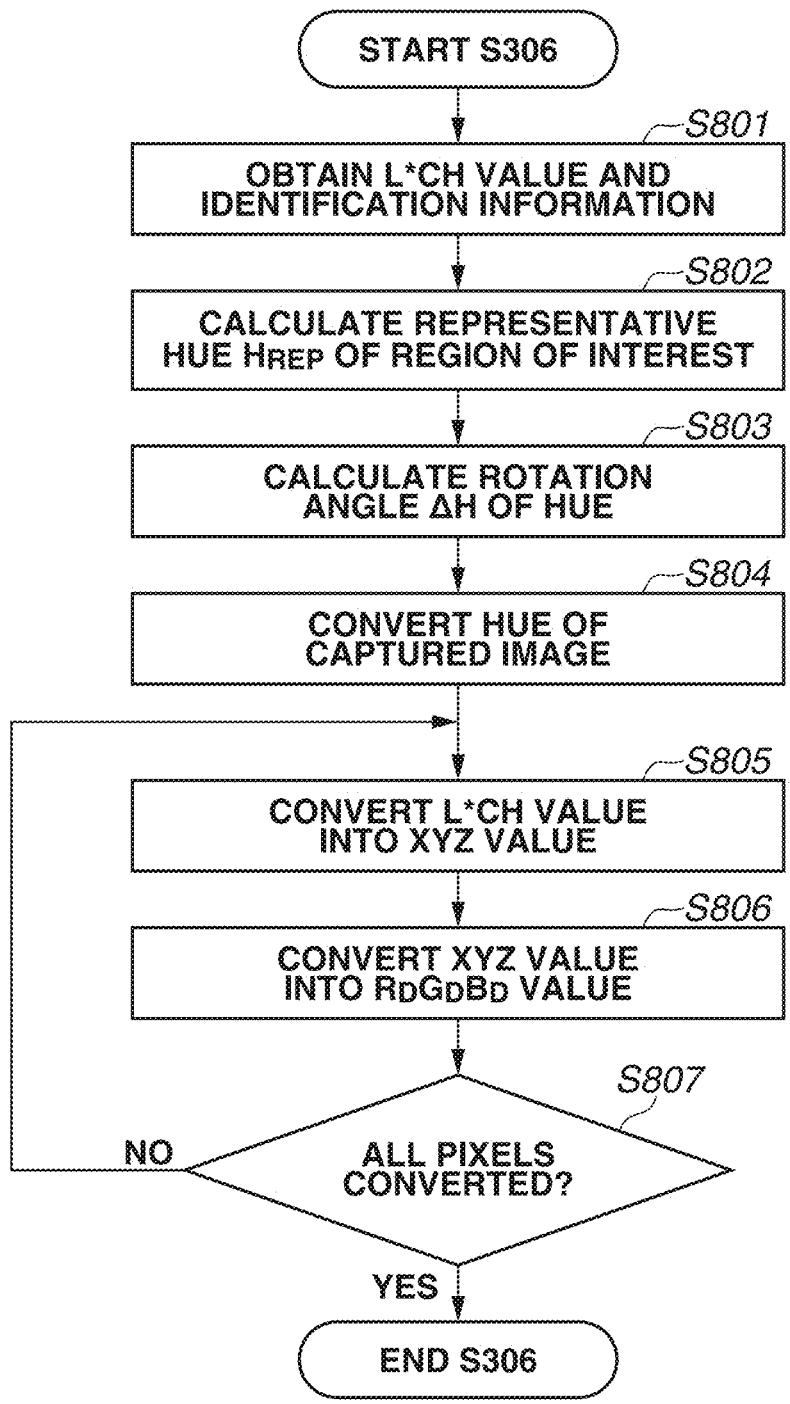
FIG. 8 is a flowchart illustrating processing for generating display image data.

In step S306, the image generation unit 204 generates display image data representing the display image B to be displayed on the display apparatus 17 based on the determination result regarding the color saturation of the region of interest. The processing for generating the display image data representing the display image B will be described in detail below. FIG. 8 is a flowchart illustrating the processing for generating the display image data representing the display image B.

In step S801, the hue rotation unit 2041 obtains the lightness L*, the color saturation C, the hue H, and the identification information as the determination result of the color saturation for all pixels in the region of interest. In step S802, the hue rotation unit 2041 calculates a representative hue $H_{REP}$ representing hues of pixels the identification information of which is one in the region of interest. The representative hue $H_{REP}$ according to the present exemplary embodiment is an average value the hues of pixels the identification information of which is one. The identification information of one indicates that the color saturation C is outside the color gamut of the display apparatus 17, and the identification information of zero indicates that the color saturation C is within the color gamut of the display apparatus 17.

In step S803, the hue rotation unit 2041 obtains a hue $H_{MAX}$ in which the display apparatus 17 can express the maximum color saturation from the color characteristic information of the display apparatus 17. Further, the hue rotation unit 2041 calculates a difference between the representative hue $H_{REP}$ and the hue $H_{MAX}$ as a rotation angle $\Delta H$ for rotating the hue of the captured image. The rotation angle $\Delta H$ is calculated according to Equation (7).

$$\Delta H = H_{MAX} - H_{REP} \quad \text{Equation (7)}$$

In step S804, the hue rotation unit 2041 converts the hues H of all pixels in the captured image into hues HR according to the rotation angle $\Delta H$ calculated by Equation (8).

$$\begin{pmatrix} L^* \\ C \\ H_R \end{pmatrix} = \begin{pmatrix} L^* \\ C \\ H + \Delta H \end{pmatrix} \quad \text{Equation (8)}$$

In step S805, the image conversion unit 2042 converts L*CH values (L*, C, HR) of the pixel of interest in the captured image into the XYZ values (X, Y, Z). Specifically, the image conversion unit 2042 converts the L*CH values (L*, C, HR) into the L*a*b* values (L*, a*, b*) according to Equation (9). Further, the image conversion unit 2042 converts the L*a*b* values (L*, a*, b*) into the XYZ values (X, Y, Z) by performing conversion inverse to the conversion in step S402.

$$\begin{pmatrix} L^* \\ a^* \\ b^* \end{pmatrix} = \begin{pmatrix} L^* \\ C*\cos(H*\pi/180) \\ C*\sin(H*\pi/180) \end{pmatrix} \quad \text{Equation (9)}$$

In step S806, the image conversion unit 2042 converts the XYZ values (X, Y, Z) of the pixel of interest into the color signal values ($R_D$, $G_D$, $B_D$) corresponding to the characteristic of the display apparatus 17. In the conversion, a color conversion LUT is used which stores a correspondence relationship between the XYZ values (X, Y, Z) and the color signal values ($R_D$, $G_D$, $B_D$). In step S807, the image conversion unit 2042 determines whether the L*CH values of all pixels in the captured image are converted into the color signal values ($R_D$, $G_D$, $B_D$). In a case where all of the L*CH values are not yet converted (NO in step S807), the image conversion unit 2042 updates the pixel of interest and returns the processing to step S805. Whereas, in a case where all of the L*CH values are converted (YES in step S807), the image conversion unit 2042 terminates the processing in step S306 and advances the processing to step S307.

The display image B is a display image which is obtained by the above-described processing in step S306 and has the color signal values ($R_D$, $G_D$, $B_D$) in each pixel. The display image B is an image in which reproduction of the color saturation is prioritized over the hue and uses the maximum color saturation which can be output by the display apparatus 17, so that a gradation of the color saturation in the region of interest is close to that of the image-captured object compared with the above-described display image A.

Figure 9:
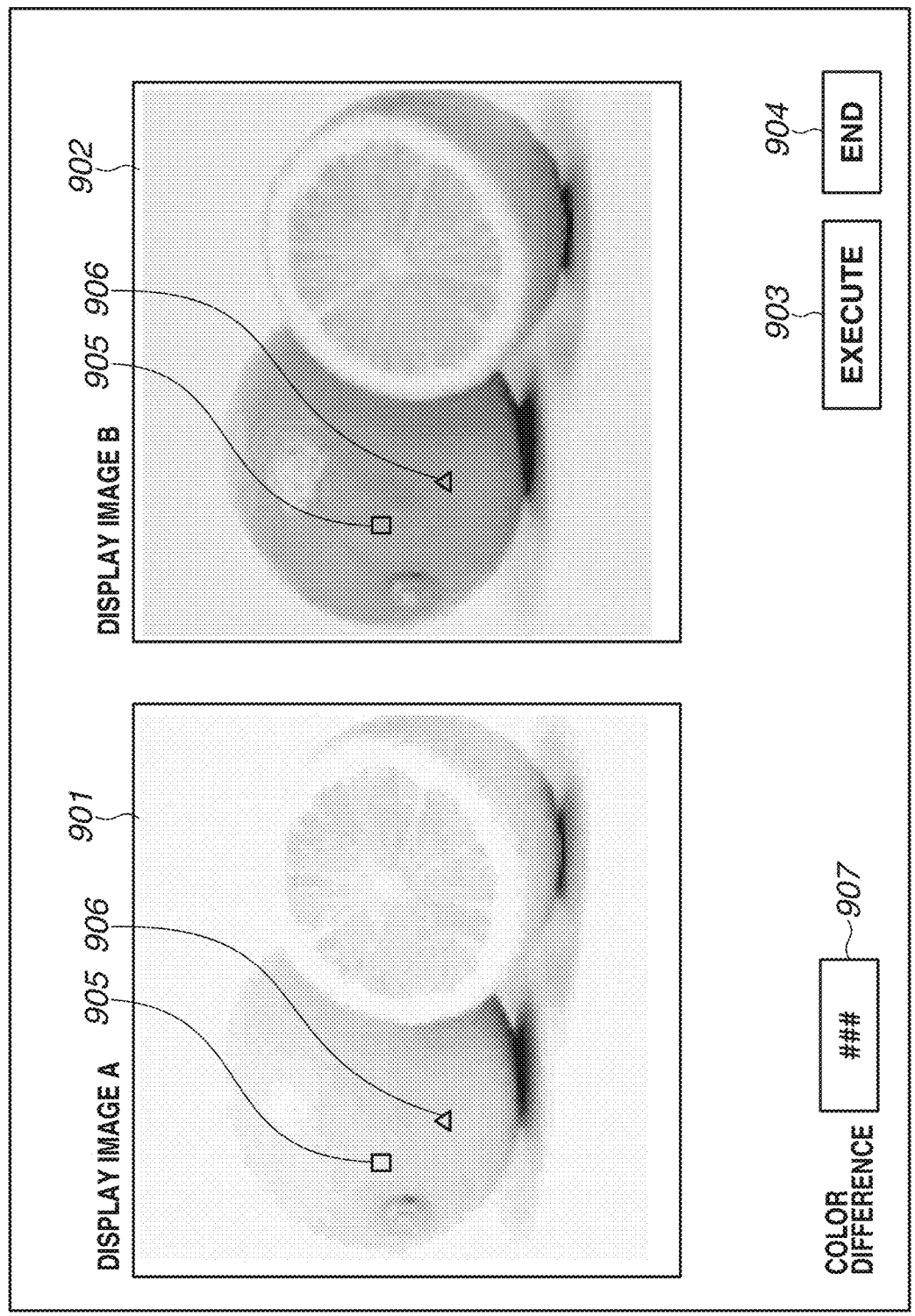
FIG. 9 illustrates a display example of a display image.

In step S307, the display control unit 206 displays the display image B and the display image A side by side. FIG. 9 illustrates a display example of the display images. A window 901 displays the display image A, and a window 902 displays the display image B. An execution button 903 is used to execute calculation of a color difference, and an end button 904 is used to end the processing. A rectangle 905 indicates the region of interest, and a triangle 906 indicates a reference region a color difference of which from the region of interest is to be calculated. The region of interest and the reference region are designated via the input device 12, and the designation reception unit 207 receives the region information about the region of interest and the reference region. If a user presses the execution button 903, the processing proceeds to step S308.

Figure 10:
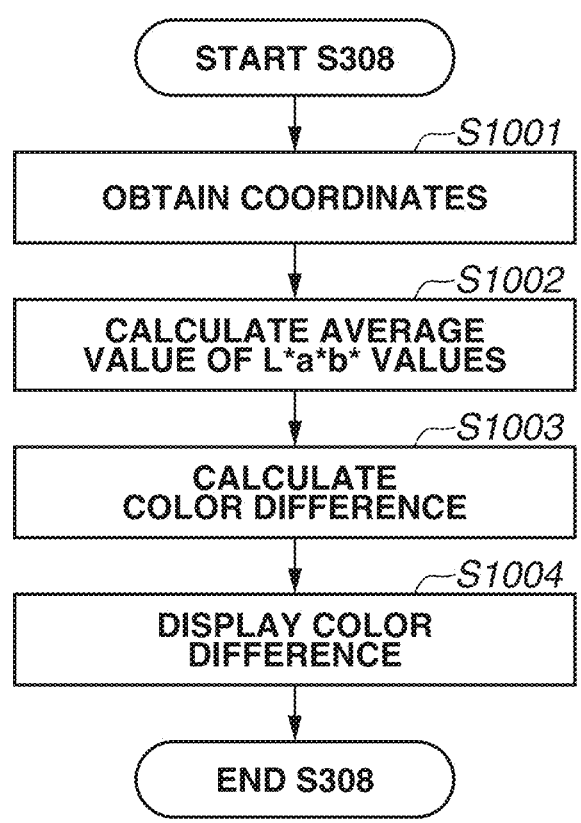
FIG. 10 is a flowchart illustrating processing for calculating a color difference.

In step S308, the color difference calculation unit 205 calculates the color difference between the region of interest and the reference region. The processing for calculating the color difference between the regions will be described in detail below. FIG. 10 is a flowchart illustrating the processing for calculating the color difference between the regions.

In step S1001, the color difference calculation unit 205 obtains coordinates of the region of interest and coordinates of the reference region. In step S1002, the color difference calculation unit 205 calculates an average value of the L*a*b* values ($L^*_1$, $a^*_1$, $b^*_1$) in the region of interest and an average value of L*a*b* values ($L^*_2$, $a^*_2$, $b^*_2$) in the reference region. In step S1003, the color difference calculation unit 205 calculates a color difference ΔE between the average value of the L*a*b* values in the region of interest and the average value of the L*a*b* values in the reference region according to Equation (10).

$$\Delta E = \sqrt{(L^*_2 - L^*_1)^2 + (a^*_2 - a^*_1)^2 + (b^*_2 - b^*_1)^2} \quad \text{Equation (10)}$$

In step S1004, the display control unit 206 displays the color difference ΔE in a value display region 907 in FIG. 9.

<Effect of First Exemplary Embodiment>

As described above, the image processing apparatus according to the present exemplary embodiment obtains image data obtained by capturing an image of an object. The image processing apparatus generates image data by converting the hue or the color saturation of the region of interest in the image represented by the obtained image data so that a specific gradation in the color saturation range is maintained in a case where conversion is performed according to the characteristic of the display unit. The image processing apparatus performs conversion on the image represented by the obtained image data and the image represented by the generated image data according to the characteristic of the display apparatus. The image processing apparatus displays the converted two images together on the display apparatus. Accordingly, a user can designate an evaluation region on the image while referring to the image which is generated based on the captured image of the object and which has the gradation of the color saturation close to the actual object.

<Modification>

According to the first exemplary embodiment, the image obtainment unit 201 obtains the captured image data from the HDD 15. However, the image obtainment unit 201 may control the image capturing apparatus 13 to capture an image of an object and obtain the captured image data. In addition, the image obtainment unit 201 may obtain a color signal value of a reference white point designated by a user on the display image A as the color signal values ($X_W$, $Y_W$, $Z_W$) without obtaining the reference white color signal values ($X_W$, $Y_W$, $Z_W$) from the HDD 15.

According to the first exemplary embodiment, the maximum color saturation $C_{MAX}$ is calculated by the processing in steps S601 to S605. However, a LUT storing a correspondence relationship between the hue H and the maximum color saturation $C_{MAX}$ may be generated in advance and used.

According to the first exemplary embodiment, the maximum color saturation $C_{MAX}$ is calculated by the processing in steps S601 to S605. However, the maximum color saturation $C_{MAX}$ which is larger than the color saturation C and which has corresponding hue closest to the hue H may be selected from the maximum color saturation of each of all the hues.

According to the first exemplary embodiment, the average values of the L*a*b* values are respectively calculated for the region of interest and the reference region. However, average values of RGB values and XYZ values may be respectively calculated and then converted into L*a*b* values.

According to the first exemplary embodiment, the color difference ΔE is calculated for evaluating the color difference between regions. However, any other known value may be used as long as the color difference can be evaluated by the value.

Figure 11:
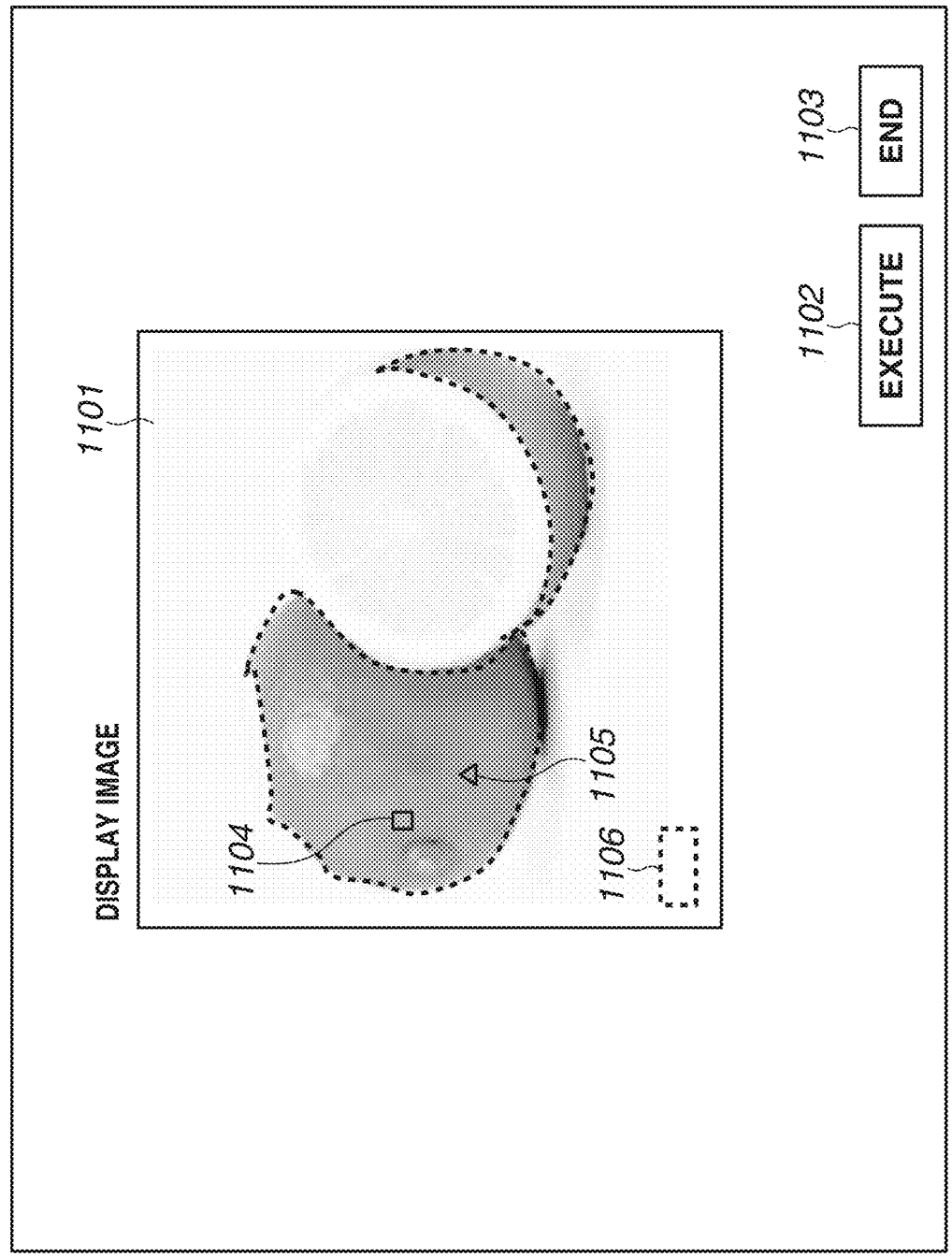
FIG. 11 illustrates a display example of a display image.

According to the first exemplary embodiment, the display image A and the display image B are displayed side by side. However, a region designated by a user in the display image A may be displayed by being replaced with a corresponding region in the display image B. In this case, in step S303, the designation reception unit 207 receives replacement region information indicating a region which is displayed by being replaced with the display image B in the display image A. In step S307, the display control unit 206 replaces a part of the display image A with a part of the display image B based on the replacement region information and displays the display image. FIG. 11 illustrates a display example of the display image. A window 1101 displays the display image. An execution button 1102 is used to execute calculation of a color difference, and an end button 1103 is used to end the processing. A rectangle 1104 indicates the region of interest, and a triangle 1105 indicates a reference region a color difference of which from the region of interest is to be calculated. A region surrounded by a dotted line 1106 indicates a region replaced with the display image B in the display image A. Accordingly, even in a case where only one image can be displayed, a user can designate an evaluation region on the image while referring to the image having the gradation of the color saturation close to the actual object. A region to be replaced and displayed is not limited to a region designated by a user and may be, for example, a region a color difference of which from the region of interest is a threshold value or less. Further, a part of the display image B may be superimposed on a part of the display image A and displayed instead of replacing the part of the display image A with the part of the display image B.

According to the first exemplary embodiment, an image is displayed by being converted to the hue in which the display apparatus 17 can output the maximum color saturation. According to a second exemplary embodiment, color conversion is performed on an image to maintain a gradation of high saturation color, and a display image is displayed without converting a hue. A hardware configuration of an image processing apparatus 1 according to the present exemplary embodiment is similar to that according to the first exemplary embodiment, so that the description thereof is omitted. A difference between the present exemplary embodiment and the first exemplary embodiment will be mainly described below. The same configuration will be described with the same reference numeral.

<Logical Configuration of Image Generation Unit 204>

Figure 12:
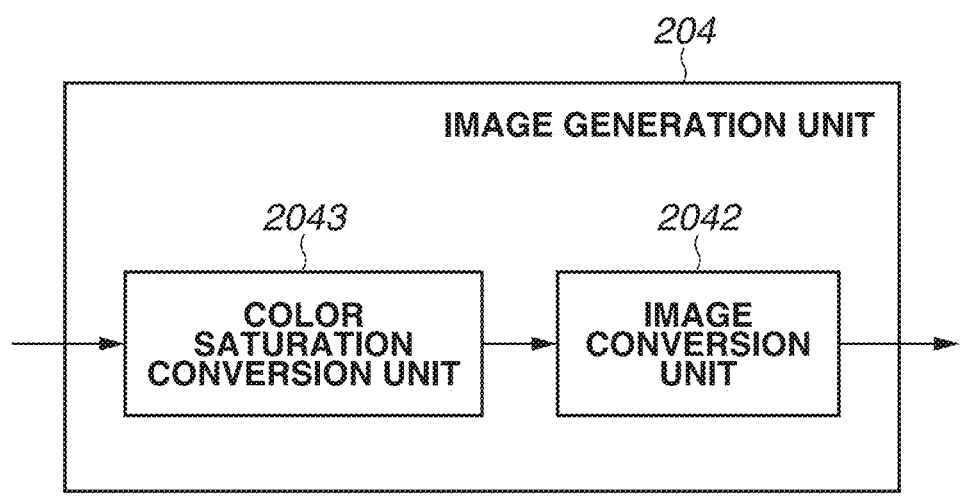
FIG. 12 is a block diagram illustrating a logical configuration of the image generation unit.

The image generation unit 204 generates display image data representing a display image to be displayed on the display apparatus 17 based on a determination result regarding color saturation of a region of interest. FIG. 12 is a block diagram illustrating a logical configuration of the image generation unit 204. The image generation unit 204 includes a color saturation conversion unit 2043 and the image conversion unit 2042. The color saturation conversion unit 2043 performs color conversion on a captured image to maintain a gradation of relatively high saturation color in a color saturation range which can be displayed by the display apparatus 17 based on the determination result regarding the color saturation of the region of interest. The image conversion unit 2042 generates display image data based on the captured image data representing the captured image the color saturation of which is converted.

<Processing for Generating Display Image Data>

In step S306, the image generation unit 204 generates the display image data representing the display image B to be displayed on the display apparatus 17 based on the determination result regarding the color saturation of the region of interest. The processing for generating the display image data representing the display image B will be described in detail below. FIG. 13 is a flowchart illustrating the processing for generating the display image data representing the display image B.

Figures 14A, 14B:
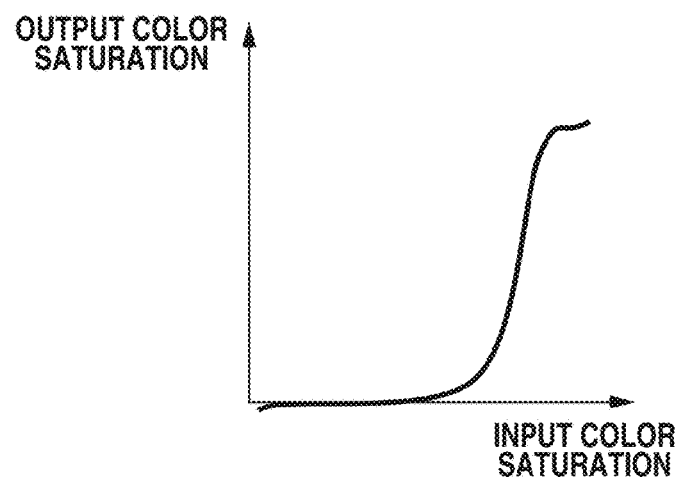
FIG. 14A illustrates a color saturation conversion look-up table (LUT)
FIG. 14B illustrates a correspondence relationship between input color saturation and output color saturation in the color saturation conversion LUT.

In step S801, the color saturation conversion unit 2043 obtains the lightness L*, the color saturation C, the hue H, and the identification information as the determination result of the color saturation for all pixels in the region of interest. In step S1301, the color saturation conversion unit 2043 converts color saturation of the pixel the identification information of which is one in the region of interest using a color saturation conversion LUT. FIG. 14A illustrates the color saturation conversion LUT. The color saturation conversion LUT stores a correspondence relationship between color saturation to be input and color saturation to be output. FIG. 14B illustrates the correspondence relationship between the input color saturation and the output color saturation in the color saturation conversion LUT. The color saturation conversion LUT stores the correspondence relationship between the input color saturation and the output color saturation to maintain the gradation of relatively high saturation color in the color saturation range which can be displayed by the display apparatus 17 as illustrated in FIGS. 14A and 14B. Values in FIG. 14A are relative values with respect to the maximum color saturation of the display apparatus 17 corresponding to a relevant hue. The processing in steps S805 to S807 by the image conversion unit 2042 is similar to that according to the first exemplary embodiment, so that the description thereof will be omitted.

<Effect of Second Exemplary Embodiment>

As described above, the image processing apparatus according to the present exemplary embodiment performs color saturation conversion on an image to maintain a gradation of relatively high saturation color in the color saturation range which can be displayed by the display apparatus and displays a display image. Accordingly, a user can designate an evaluation region on the image while referring to the image which is generated by maintaining the hue and which has the gradation of the color saturation close to an actual object.

<Modification>

Figure 15:
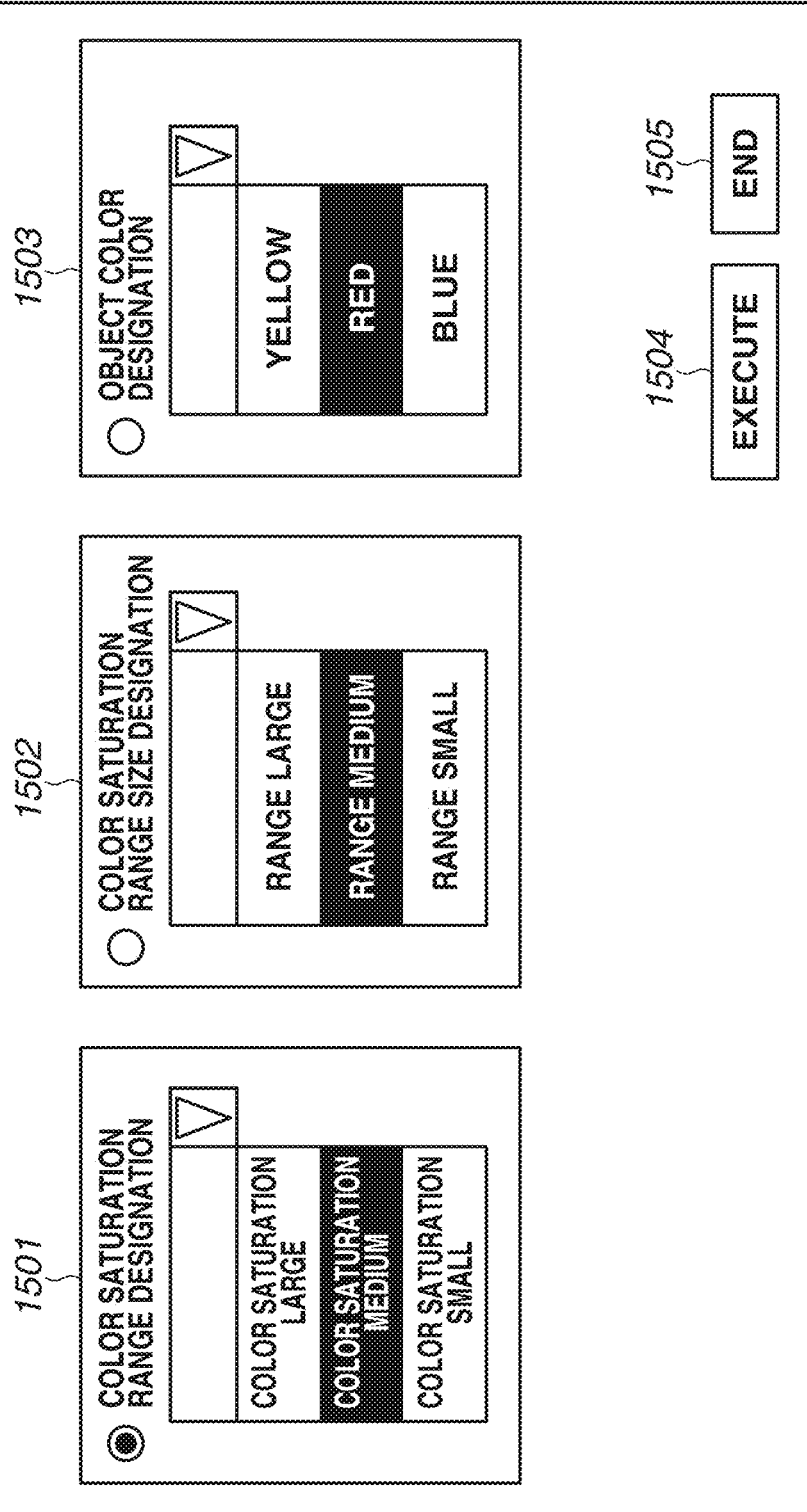
FIG. 15 illustrates a user interface (UI) for designating a color saturation conversion method.

According to the second exemplary embodiment, color saturation conversion is performed using one type of the color saturation conversion LUT determined in advance. However, a color saturation conversion LUT to be used in color saturation conversion may be selected from a plurality of types of color saturation conversion LUTs according to an application. FIG. 15 illustrates a user interface (UI) for designating a color saturation conversion method. A combo box 1501 is used to designate the color saturation range the gradation is to be maintained to perform color saturation conversion. A combo box 1502 is used to designate a size of the color saturation range in which the gradation is to be maintained. A combo box 1503 is used to designate the color saturation range according to a hue of an object. An execution button 1504 is used to execute color conversion, and an end button 1505 is used to end the processing.

Figure 16A:
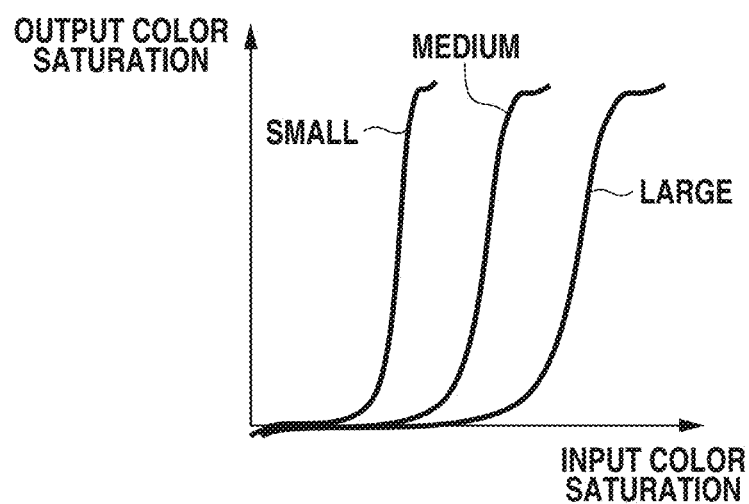
FIG. 16A, FIG. 16B, and FIG. 16C schematically illustrate a characteristic of the color saturation conversion LUT.
Figure 16B:
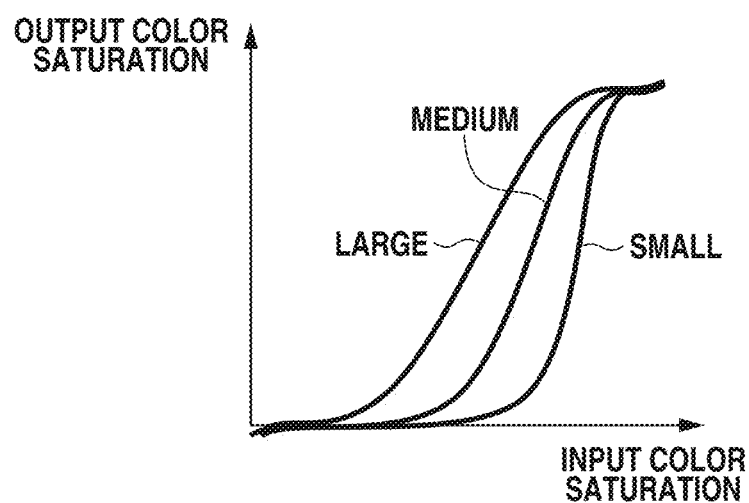
Figure 16C:
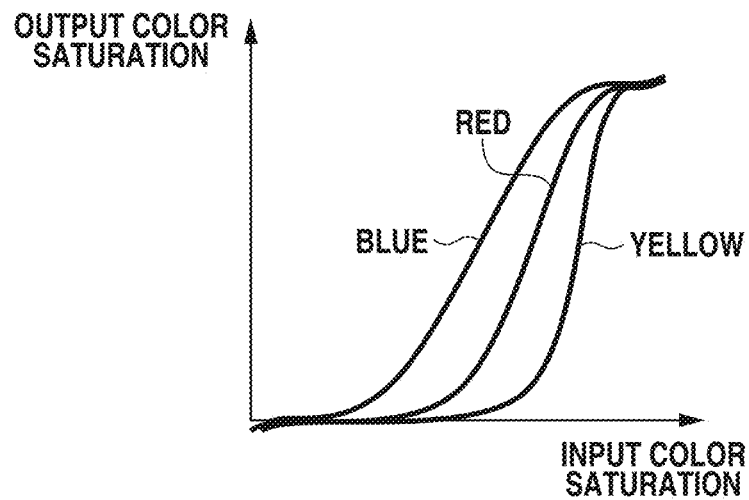

FIGS. 16A to 16C schematically illustrate characteristics of the respective color saturation conversion LUTs. FIG. 16A illustrates the characteristic of the color saturation conversion LUT corresponding to the combo box 1501. The maximum color saturation that the display apparatus 17 can output is different for each hue. In other words, a relatively high color saturation range in the color saturation range which can be output by the display apparatus 17 is different for each hue. In the combo box 1501, a user can designate the color saturation range in which the gradation is to be maintained. FIG. 16B illustrates the characteristic of the color saturation conversion LUT corresponding to the combo box 1502. In the combo box 1502, a user can designate a size of the color saturation range in which the gradation is to be maintained. FIG. 16C illustrates the characteristic of the color saturation conversion LUT corresponding to the combo box 1503. In the combo box 1503, a user can designate the color saturation range in which the gradation is to be maintained by directly designating the hue of the object. As described above, the color saturation conversion LUT to be used for color saturation conversion is designated from a plurality of types of color saturation conversion LUTs, and thus the color saturation conversion suitable for color of an object can be performed.

According to the above-described exemplary embodiments, a pixel value of a captured image is converted into L*a*b* values, and a hue or color saturation is converted based on the L*a*b* values. According to a third exemplary embodiment, display image data is generated using a color conversion LUT storing a correspondence relationship between a pixel value of a captured image and a color signal value after being subjected to conversion of a hue or color saturation. A hardware configuration of an image processing apparatus 1 according to the present exemplary embodiment is similar to that according to the first exemplary embodiment, so that the description thereof will be omitted. A difference between the present exemplary embodiment and the first exemplary embodiment will be mainly described below. The same configuration will be described with the same reference numeral.

<Logical Configuration of Image Processing Apparatus>

Figure 17:
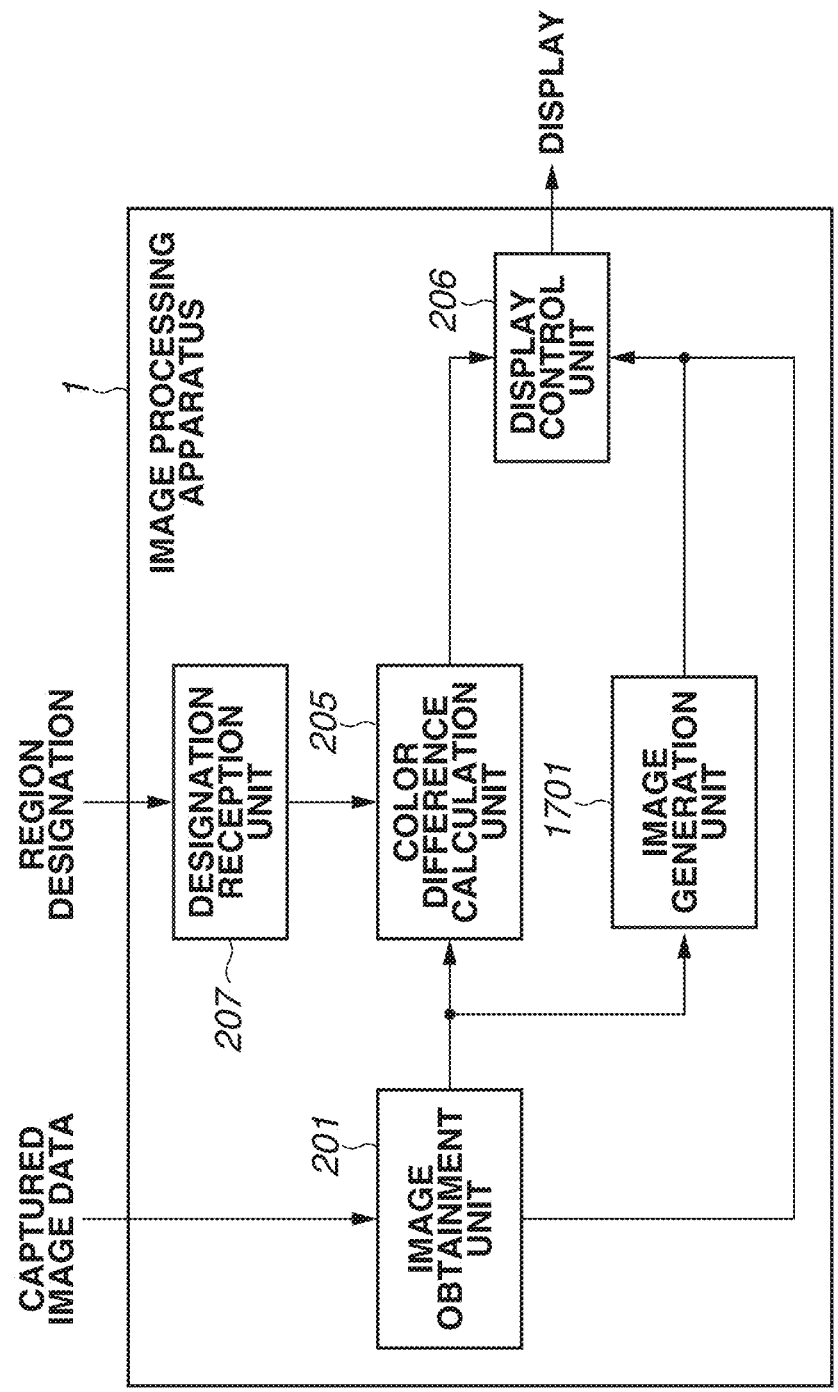
FIG. 17 is a block diagram illustrating a logical configuration of the image processing apparatus.

FIG. 17 is a block diagram illustrating a logical configuration of the image processing apparatus 1. The CPU 101 functions as a logical configuration illustrated in FIG. 17 by using the RAM 103 as the work memory and reading and executing a program stored in the ROM 102 or the HDD 15. It is not necessary for the CPU 101 to execute all processing described below, and the image processing apparatus 1 may be configured so that a part or all of the processing is executed by one or a plurality of processing circuits other than the CPU 101.

The image processing apparatus 1 includes the image obtainment unit 201, an image generation unit 1701, the color difference calculation unit 205, the display control unit 206, and the designation reception unit 207. The image generation unit 1701 generates display image data using a color conversion LUT storing a correspondence relationship between a pixel value of a captured image and a color signal value after being subjected to conversion of a hue or color saturation.

<Processing Executed by Image Processing Apparatus>

Figure 18:
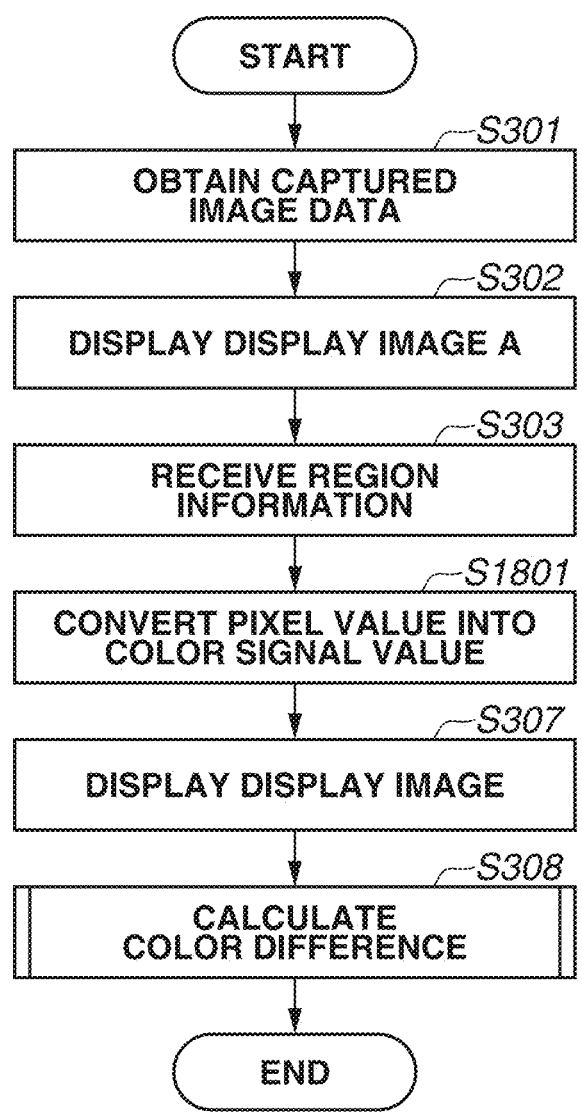
FIG. 18 is a flowchart illustrating processing executed by the image processing apparatus.

FIG. 18 is a flowchart illustrating processing executed by the image processing apparatus 1. The processing described below is started by a user instruction via the input device 12. The processing in steps S301 to S303, S307, and S308 is similar to that according to the above-described exemplary embodiments, and thus the description thereof will omitted.

In step S1801, the image generation unit 1701 converts pixel values (R, G, B) of each pixel included in a captured image into color signal values ($R_D$, $G_D$, $B_D$) corresponding to the characteristic of the display apparatus 17 using the color conversion LUT. The color conversion LUT used in this processing is generated and stored in the HDD 15 in advance. The color conversion LUT stores a correspondence relationship between pixel values (R, G, B) corresponding to each grid point equally arranged in an RGB color space dependent on the image capturing apparatus 13 and color signal values ($R_D$, $G_D$, $B_D$) a hue or color saturation of which is converted by the above-described processing in step S306. The color conversion LUT can be generated in advance by performing the above-described processing in steps S304 and S306 with respect to the pixel values (R, G, B) corresponding to each grid point equally arranged in the RGB color space dependent on the image capturing apparatus 13.

<Effect of Third Exemplary Embodiment>

As described above, the image processing apparatus according to the present exemplary embodiment generates display image data using the color conversion LUT storing the correspondence relationship between a pixel value of a captured image and a color signal value after being subjected to conversion of a hue or color saturation. Accordingly, the image processing apparatus can perform color conversion which maintains a gradation of high saturation color without performing hue rotation processing and thus can reduce a calculation cost.

<Modification>

According to the third exemplary embodiment, the color conversion LUT storing the correspondence relationship between the pixel value of the captured image and the color signal value after being subjected to conversion of the hue or the color saturation is used. However, conversion using a matrix and gamma conversion may be performed instead of conversion using the color conversion LUT.

According to embodiments of the present disclosure, a user can designate an evaluation region on an image while referring to the image which is generated based on a captured image of an object and which has a gradation of color saturation close to the actual object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc ($B_D$)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-197998, filed Oct. 30, 2019, which is hereby incorporated by reference herein in its entirety.

What is claimed is:

1. An image processing apparatus comprising:
   an obtainment unit configured to obtain first image data obtained by capturing an image of an object;
   a generation unit configured to generate second image data representing a second image by performing conversion to maintain a specific gradation in a color saturation range in a case where a hue or color saturation of a region of interest in a first image represented by the first image data is converted according to a characteristic of a display unit;
   a conversion unit configured to perform conversion on the first image and the second image according to the characteristic of the display unit; and
   a display control unit configured to display the converted first image and the converted second image together on the display unit
   wherein the generation unit performs conversion on color of the region of interest by prioritizing the color saturation over the hue.

2. The image processing apparatus according to claim 1, wherein the specific gradation is a gradation corresponding to high saturation color.

3. The image processing apparatus according to claim 1, wherein the region of interest is a region including a plurality of pixels, and
   wherein the image processing apparatus further comprises a determination unit configured to calculate a representative hue in the region of interest and to determine whether to perform conversion on color with respect to each of the plurality of pixels according to the representative hue.

4. The image processing apparatus according to claim 3, wherein the determination unit calculates an average value of a hue hues each corresponding to a different one of the plurality of pixels as the representative hue.

5. The image processing apparatus according to claim 3, wherein the determination unit determines whether to perform the conversion on color with respect to each of the plurality of pixels by comparing maximum color saturation which corresponds to the representative hue and can be displayed by the display unit with color saturations each corresponding to a different one of the plurality of pixels.

6. The image processing apparatus according to claim 3, wherein the generation unit performs conversion on the hue of the region of interest so that the representative hue is to be a hue corresponding to maximum color saturation which can be displayed by the display unit.

7. The image processing apparatus according to claim 1, wherein the generation unit performs conversion on the hue of the region of interest in the first image.

8. The image processing apparatus according to claim 1, wherein the generation unit performs conversion on the color saturation of the region of interest in the first image.

9. The image processing apparatus according to claim 8, wherein the generation unit performs the conversion on the color saturation of the region of interest in the first image using a look-up table for performing color conversion to maintain a specific gradation corresponding to high saturation color.

10. The image processing apparatus according to claim 9, wherein the generation unit selects the look-up table to be used for the conversion of the color saturation from a plurality of types of look-up tables according to a user instruction.

11. The image processing apparatus according to claim 10, wherein the plurality of types of look-up tables includes a plurality of types of look-up tables having different color saturation ranges in which a gradation is to be maintained.

12. The image processing apparatus according to claim 10, wherein the user instruction is an instruction to specify a hue of the object.

13. The image processing apparatus according to claim 1, wherein the generation unit performs conversion based on a user instruction for specifying the color saturation range in which the specific gradation is to be maintained.

14. The image processing apparatus according to claim 1, wherein the generation unit performs the conversion based on a user instruction for specifying a size of the color saturation range in which the specific gradation is to be maintained.

15. The image processing apparatus according to claim 1, wherein the display control unit displays the converted first image and the converted second image side by side on the display unit.

16. A method for processing an image, the method comprising:
    obtaining first image data obtained by capturing an image of an object;
    generating second image data representing a second image by performing conversion to maintain a specific gradation in a color saturation range in a case where a hue or color saturation of a region of interest in a first image represented by the first image data is converted according to a characteristic of a display unit;
    performing conversion on the first image and the second image according to the characteristic of the display unit; and
    displaying the converted first image and the converted second image together on the display unit
    wherein the generating performs conversion on color of the region of interest by prioritizing the color saturation over the hue.

17. A non-transitory computer-readable storage medium storing instructions that, when executed by a computer, cause the computer to perform a method for processing an image, the method comprising:
    obtaining first image data obtained by capturing an image of an object;
    generating second image data representing a second image by performing conversion to maintain a specific gradation in a color saturation range in a case where a hue or color saturation of a region of interest in a first image represented by the first image data is converted according to a characteristic of a display unit;
    performing conversion on the first image and the second image according to the characteristic of the display unit; and
    displaying the converted first image and the converted second image together on the display unit,
    wherein the generating performs conversion on color of the region of interest by prioritizing the color saturation over the hue.

* * * * *